(12) United States Patent
Nolte et al.

(10) Patent No.: US 11,942,766 B2
(45) Date of Patent: Mar. 26, 2024

(54) CLAMP APPARATUS

(71) Applicant: Utility Solutions, Inc., Hickory, NC (US)

(72) Inventors: Matthew Nolte, Hickory, NC (US);
Aaron Wood, Hickory, NC (US);
Michael Mingus, Hickory, NC (US);
Peter Shirilla, Hickory, NC (US);
Jonathon S. Spencer, Hickory, NC (US)

(73) Assignee: Utility Solutions, Inc., Hickory, NC (US)

( * ) Notice: Subject to any disclaimer, the term of this patent is extended or adjusted under 35 U.S.C. 154(b) by 809 days.

(21) Appl. No.: 17/038,015

(22) Filed: Sep. 30, 2020

(65) Prior Publication Data

US 2021/0095704 A1 Apr. 1, 2021

Related U.S. Application Data

(60) Provisional application No. 62/908,062, filed on Sep. 30, 2019.

(51) Int. Cl.
*H02G 1/02* (2006.01)
*H01R 4/48* (2006.01)
*H02G 3/32* (2006.01)

(52) U.S. Cl.
CPC ............... *H02G 1/02* (2013.01); *H01R 4/48* (2013.01); *H02G 3/32* (2013.01)

(58) Field of Classification Search
CPC .......... H02G 1/02; H02G 3/32; H01H 31/006; H01H 85/0208; H01R 4/48; A47F 13/06; F16M 13/022
USPC .......................................... 294/174, 191, 211
See application file for complete search history.

(56) References Cited

U.S. PATENT DOCUMENTS

| | | | | |
|---|---|---|---|---|
| 1,752,575 A | * | 4/1930 | Roselle | H01H 85/0208 81/3.8 |
| 3,521,332 A | * | 7/1970 | Kramer | F16L 3/13 248/912 |
| 5,697,591 A | * | 12/1997 | Cooper | F21V 21/08 362/396 |
| 6,338,460 B1 | * | 1/2002 | Rumpel | F21S 4/10 362/396 |
| 8,616,926 B2 | * | 12/2013 | Byrne | H01R 11/22 439/861 |
| 9,702,503 B2 | * | 7/2017 | Chi Man | B05B 15/62 |
| 10,823,312 B2 | * | 11/2020 | Vaccaro | F16L 3/133 |
| 2013/0333197 A1 | * | 12/2013 | Schulte | F21V 21/08 29/525.08 |

* cited by examiner

*Primary Examiner* — Dean J Kramer
(74) *Attorney, Agent, or Firm* — Trego, Hines & Ladenheim PLLC; Brandon C. Trego; Jonathan M. Hines

(57) ABSTRACT

A clamp apparatus is disclosed. The clamp apparatus includes a first half having a first end and a second end; a second half having a first end and a second end, the first and second halves being connected together at the first ends; and wherein the second end of the first half and the second end of the second half are flared outwardly away from a centerline of the clamp apparatus to receive a conductor therebetween.

13 Claims, 13 Drawing Sheets

CLAMP APPARATUS

BACKGROUND OF THE INVENTION

This invention relates generally to a clamp apparatus, and more particularly to a conductor clamp and/or hanger for temporarily securing multiple conductors in a compact relation.

Conductor and/or cord management is important for the safety of lineman when working on power transmission lines. Often times, a lineman needs to move a conductor out of the way or hang and attach a new conductor or jumper which requires the lineman to use his/her hands to hold, manipulate, etc. multiple conductors which can create a dangerous situation.

Accordingly, there is a need for a clamp apparatus that allows a lineman to safely manage multiple conductors.

BRIEF SUMMARY OF THE INVENTION

This need is addressed by the present invention, which provides a clamp apparatus that secures multiple conductors in a compact relation.

According to an aspect of the invention, a clamp apparatus includes a first half having a first end and a second end; a second half having a first end and a second end, the first and second halves being connected together at the first ends; and wherein the second end of the first half and the second end of the second half are flared outwardly away from a centerline of the clamp apparatus to receive a conductor therebetween.

According to another aspect of the invention, a method of using a clamp apparatus having a first half having a first end and a second end; a second half having a first end and a second end, the first and second halves being connected together at the first ends; and wherein the second end of the first half and the second end of the second half are flared outwardly away from a centerline of the clamp apparatus to receive a conductor therebetween, includes positioning a conductor between the second end of the first half and the second end of the second half; pushing the clamp apparatus against the conductor to move the clamp apparatus to an open position, the clamp apparatus is pushed against the conductor until the conductor is positioned in a first opening of the first half and a second opening of the second half; and rotating the clamp apparatus to position the conductor in an opening of the clamp apparatus and move the clamp apparatus to a closed position, thereby securing the clamp apparatus to the conductor.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
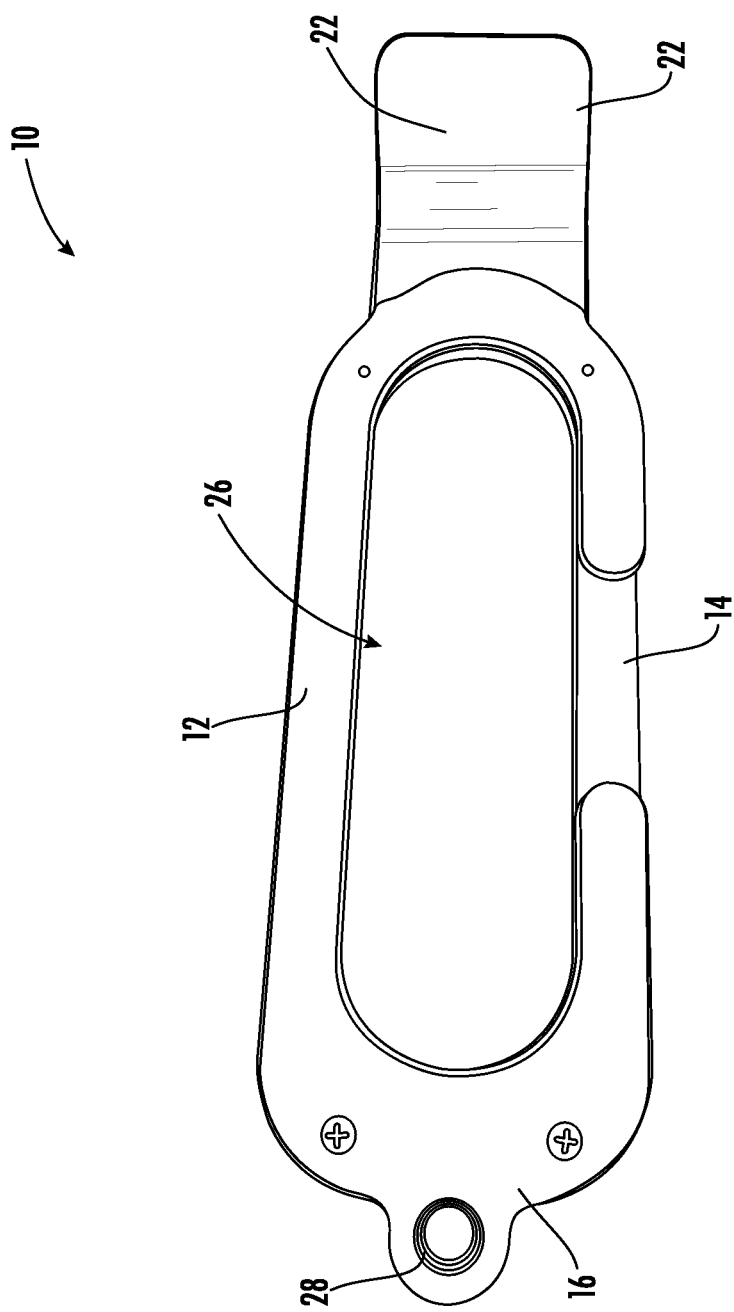
FIG. 1 shows a clamp apparatus according to an embodiment of the invention.
Figure 3:
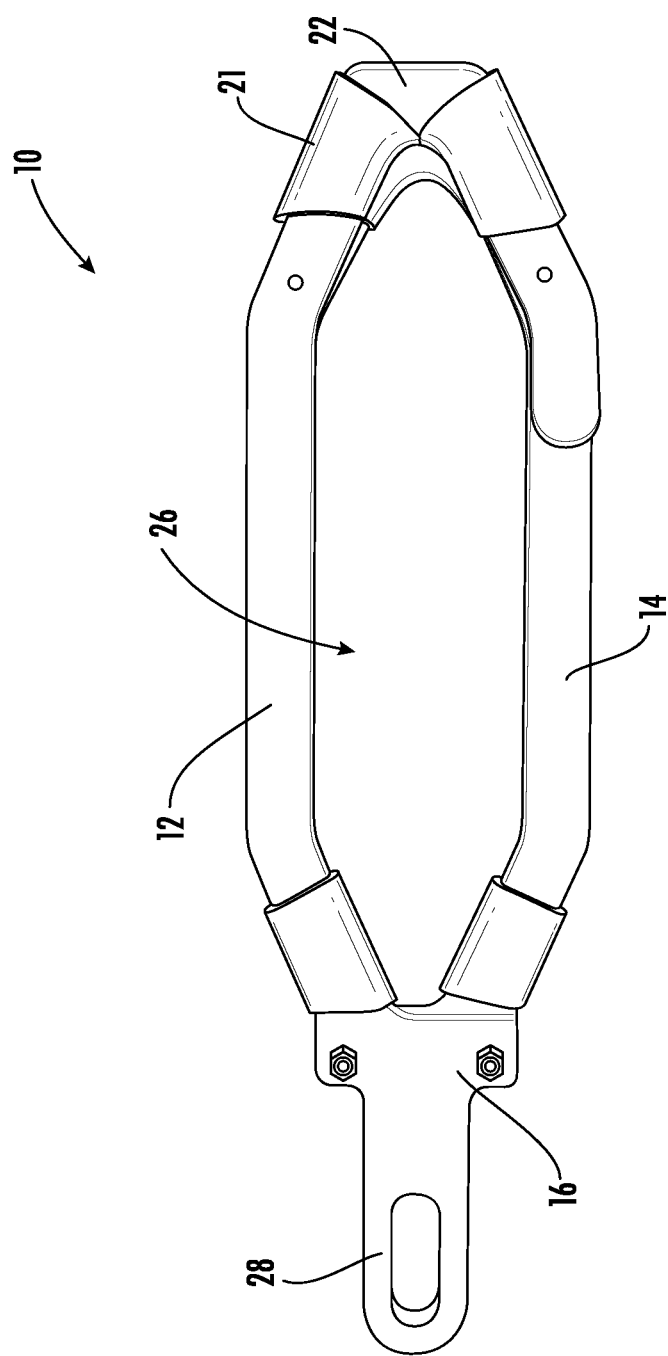
FIGS. 3 and 4 show the clamp apparatus of FIG. 1 with a different end shape.
Figure 4:
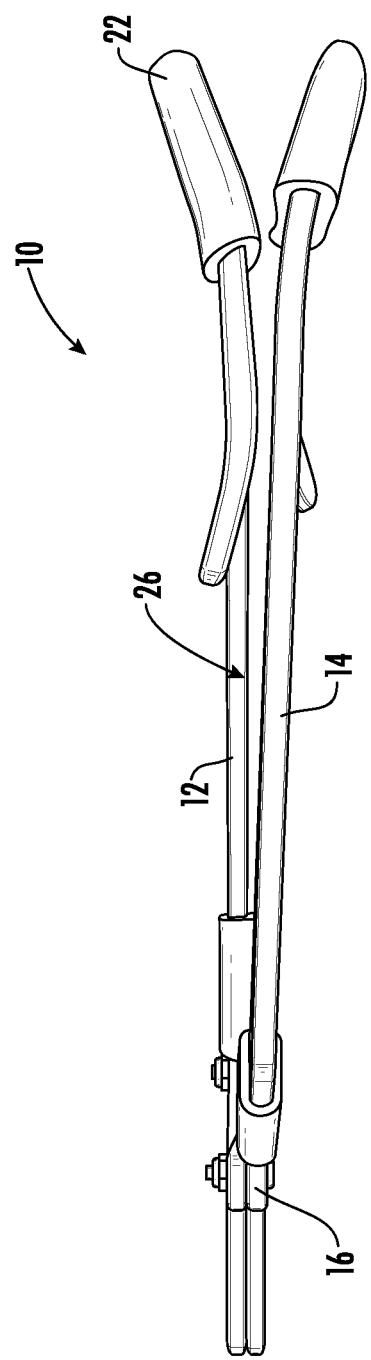
Figure 5:
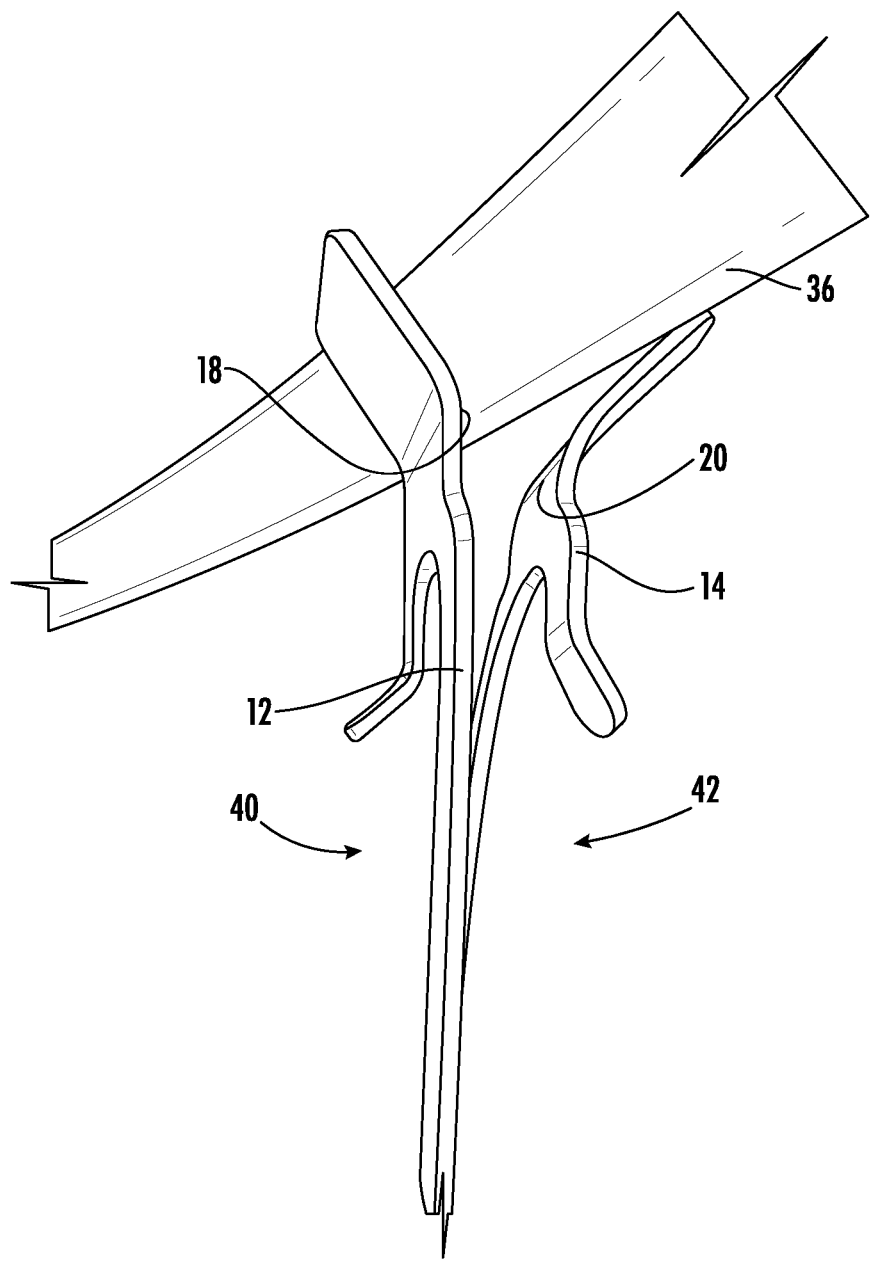
FIG. 5 shows the clamp apparatus being pushed onto a second conductor.
Figure 6:
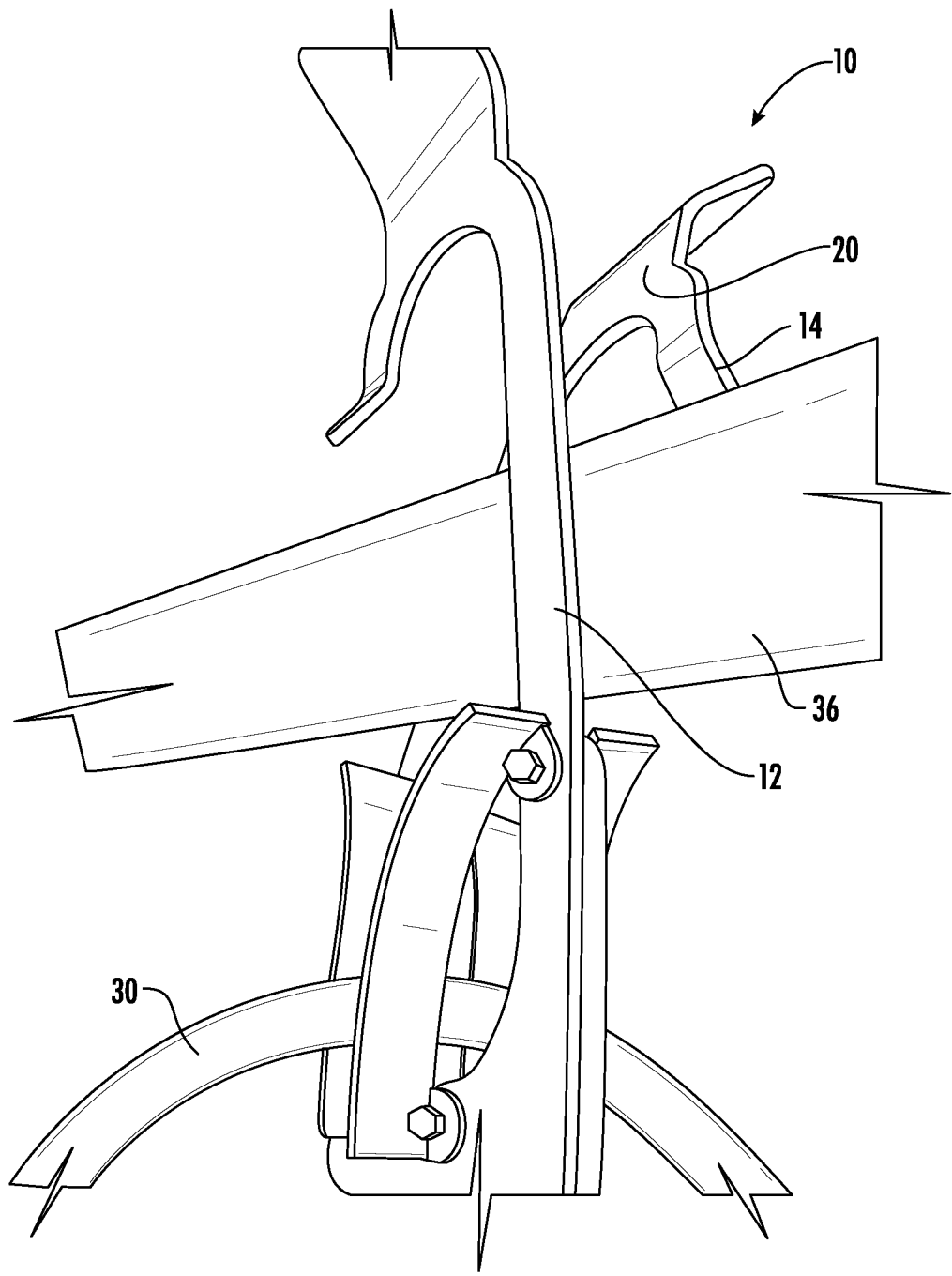
FIG. 6 shows the clamp apparatus being installed on the second conductor.
Figure 7:
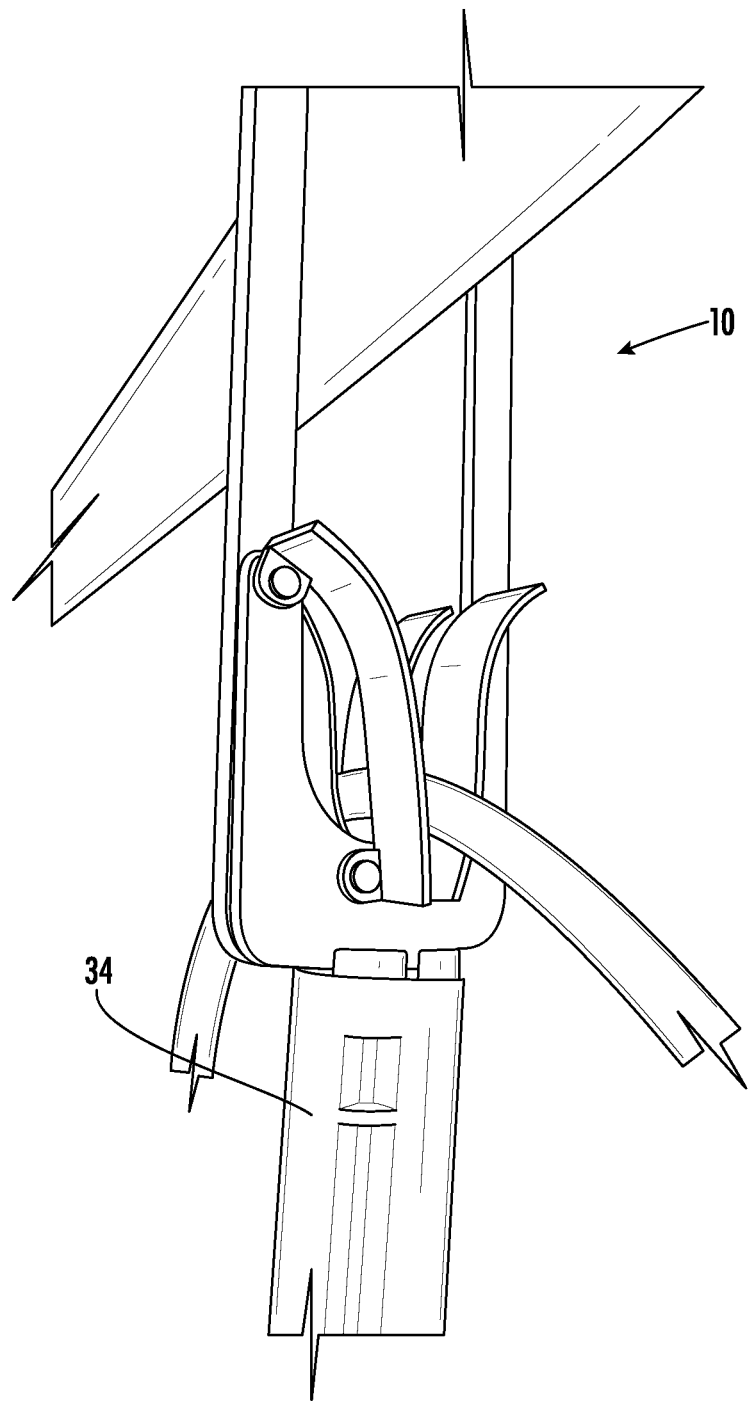
FIG. 7 shows the clamp apparatus installed on the second conductor with the first conductor secured in the clamp apparatus.
Figure 8:
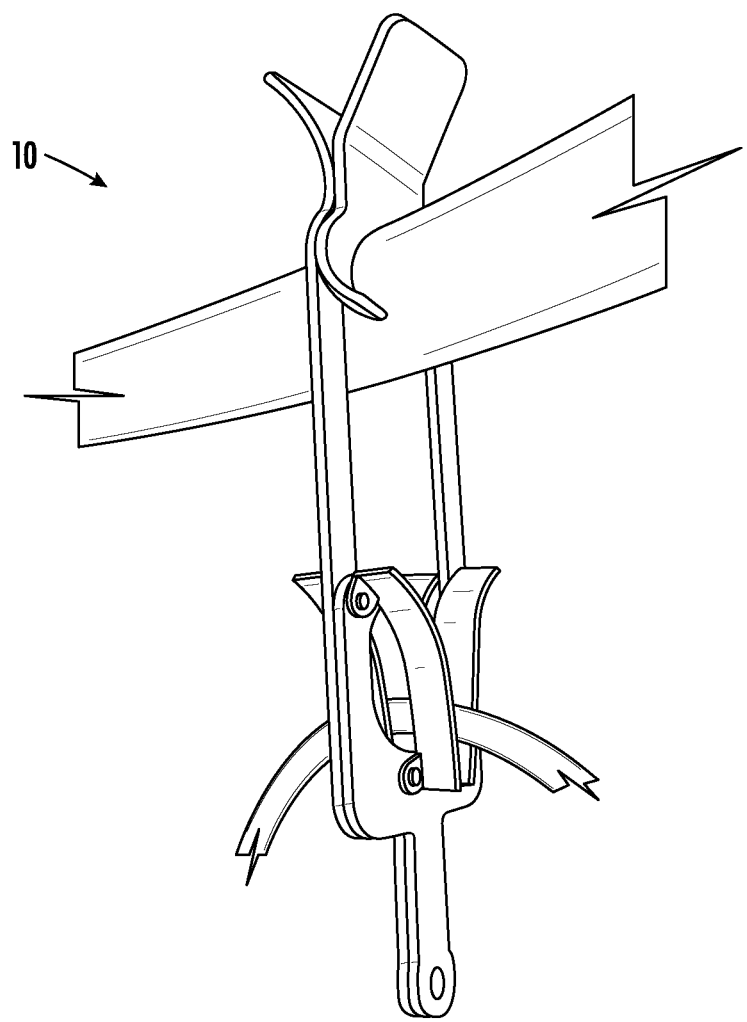
FIG. 8 shows the clamp apparatus installed on the second conductor with the hot stick removed.
Figure 9:
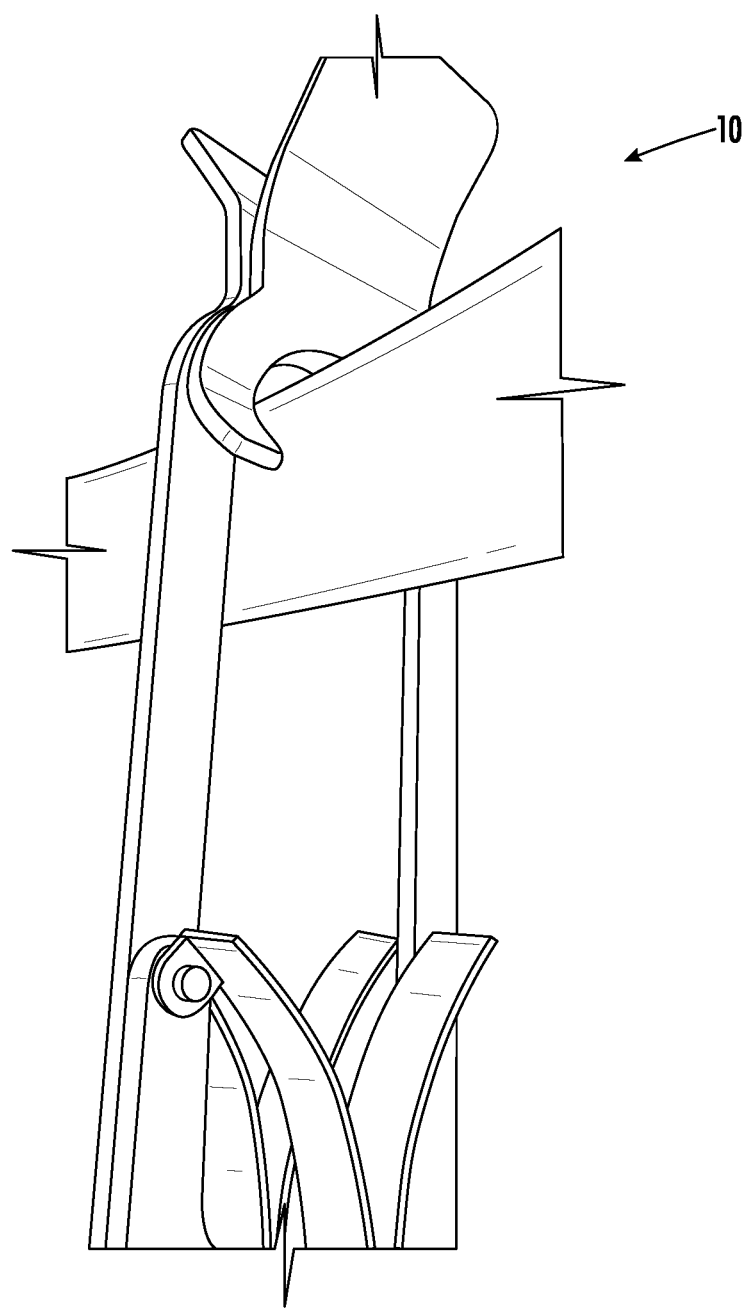
FIG. 9 shows the clamp apparatus installed on the second conductor.
Figure 10:
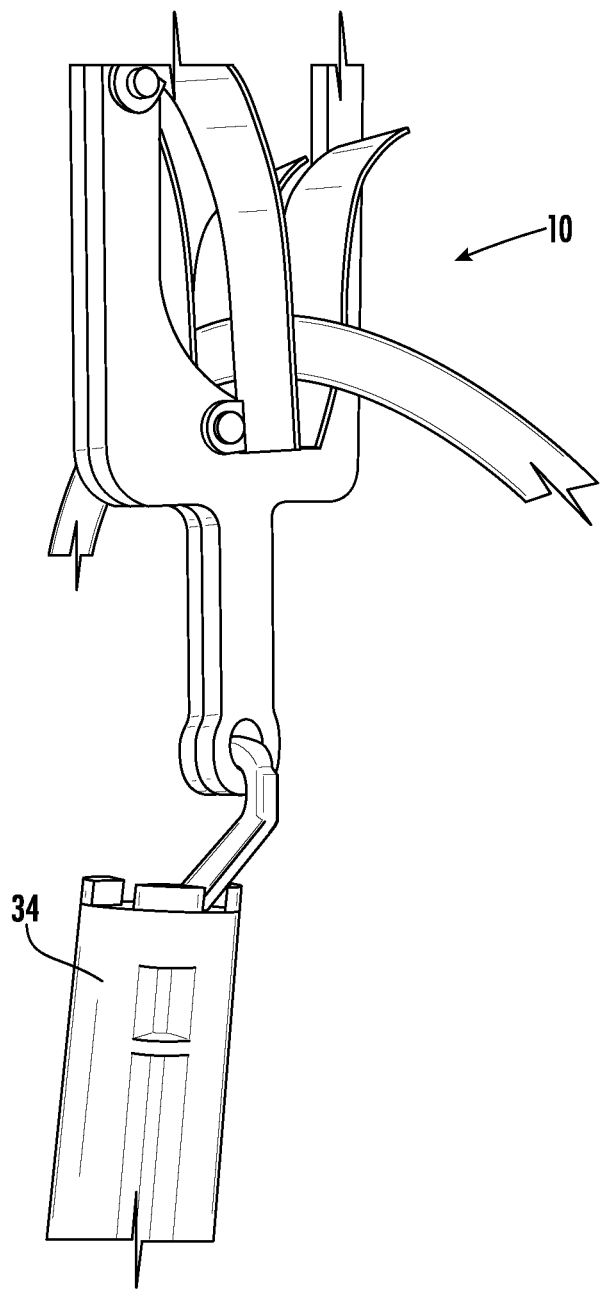
FIG. 10 shows the hot stick installed on the clamp apparatus.

Referring to the drawings wherein identical reference numerals denote the same elements throughout the various views, FIG. 1 illustrates an exemplary clamp apparatus 10 constructed according to an aspect of the present invention. As shown, the clamp apparatus 10 includes first and second C-shaped halves 12 and 14 (as defined herein, a C-shaped half refers to a half that is closed on 3 sides and open or partially open on a fourth side—as shown in FIGS. 1, 3 and 4, the ends may be rounded, V-shaped, or any other suitable shape). The first and second halves 12 and 14 are connected together at a first end 16 such that a rear face 18 of the first half 12 rests against a rear face 20 of the second half 14 (this causes the C-shaped halves to be reversed from each other such that the partial opening of the "C" in the first half is closed off by the second half). The first and second halves 12, 14 are not connected together at a second end 22 of the clamp apparatus 10 to allow the clamp apparatus 10 to move from a closed position, FIG. 1, to an open position, FIGS. 5 and 6, where a conductor can be received between rear faces 18 and 20 and back to a closed position, FIG. 7, where the conductor is secured in an opening 26 of the clamp apparatus 10. As illustrated, the first and second halves 12, 14 are flared outwardly at the second end 22 of the clamp apparatus 10. An aperture 28 is positioned at the first end 16 to receive a hot stick.

Figure 2:
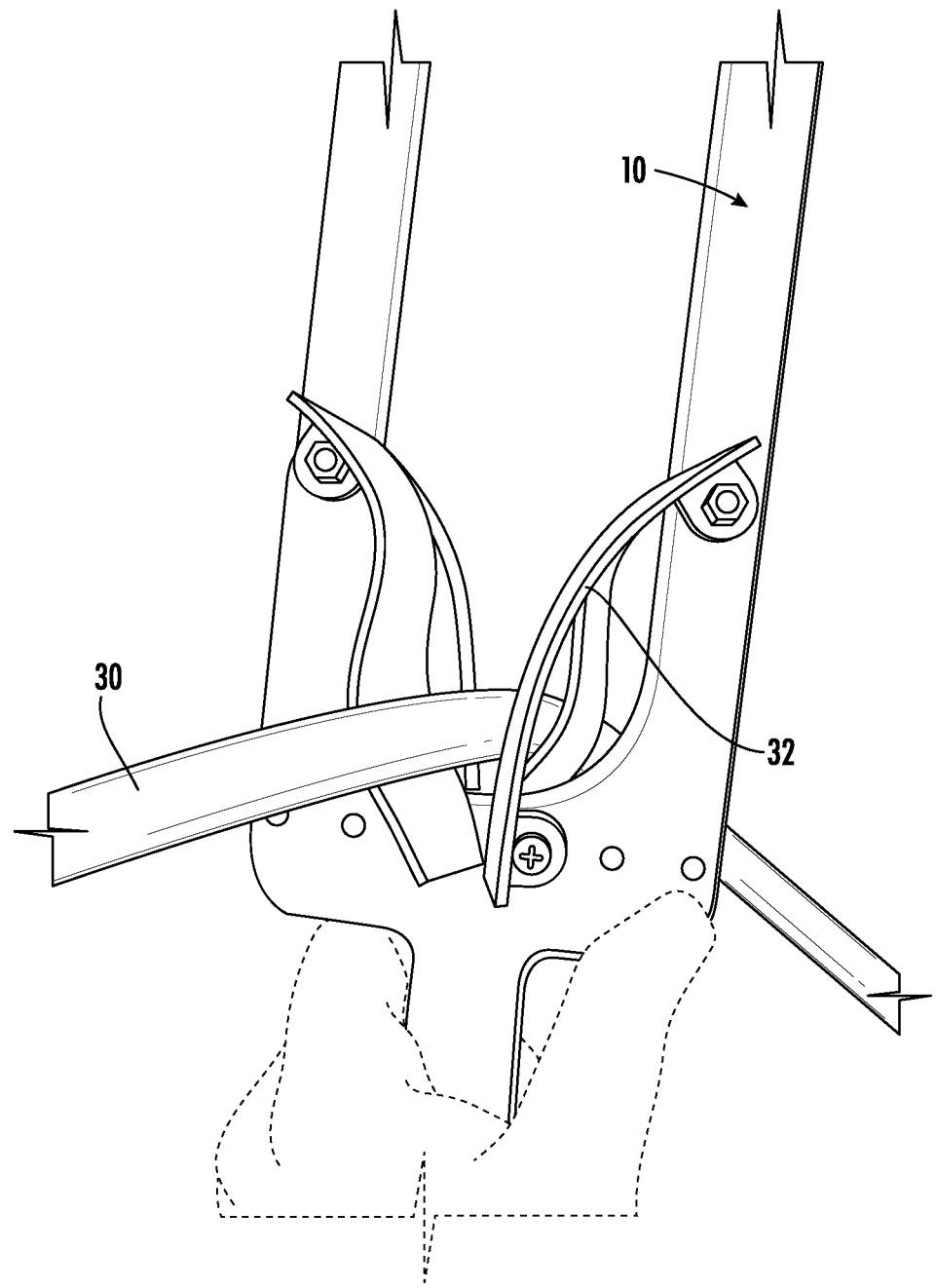
FIG. 2 shows a first conductor positioned in the clamp apparatus.

As illustrated in FIG. 2, the clamp apparatus 10 may include fingers 32 for securing a first conductor therebetween. The fingers may be flexible to conform to the first conductor or rigid. The fingers 32 are connected to the clamp apparatus 10 at the first end 16 of the clamp apparatus 10. It should be appreciated that while the fingers 32 are described below in use, the fingers 32 are optional and are not required.

Referring to FIGS. 3 and 4, unlike the rounded first and second ends 16 and 22 may be formed of different shapes. For example, as shown, the first and second ends 16 and 18 may be V-shaped. Additionally, the first and second ends 16 and 22 may include anti-slip pads 21 positioned thereon to prevent the clamp apparatus 10 from sliding along a conductor. The pads 21 may be of any suitable material to prevent the clamp apparatus 10 from sliding along the conductor (for example, rubber).

In use, referring to FIGS. 5-10, a first conductor 30 is positioned in the clamp apparatus 10 and held in position by fingers 32. A user then uses a hot stick 34 connected to aperture 28 of the clamp apparatus 10 to raise the clamp apparatus to a second conductor 36. It should be appreciated, that a user may also place the clamp apparatus 10 onto a conductor by hand, as opposed to, using a hot-stick. The second conductor 36 is positioned between the flared second end 22 such that the second conductor 36 is positioned between the first and second halves 12, 14. The user then pushes the clamp apparatus 10 upward such that the second conductor 36 is positioned at about a middle of the clamp apparatus 10 and in alignment with openings 40, 42 of the first and second halves 12, 14. The clamp apparatus 10 is then rotated to allow the second conductor 36 to be positioned in the opening 26 and allow the first and second halves 12, 14 to move back to a closed position. The hot stick is then removed and the clamp apparatus 10 maintains the first and second conductors 30, 36 in a compact relation.

Figure 11:
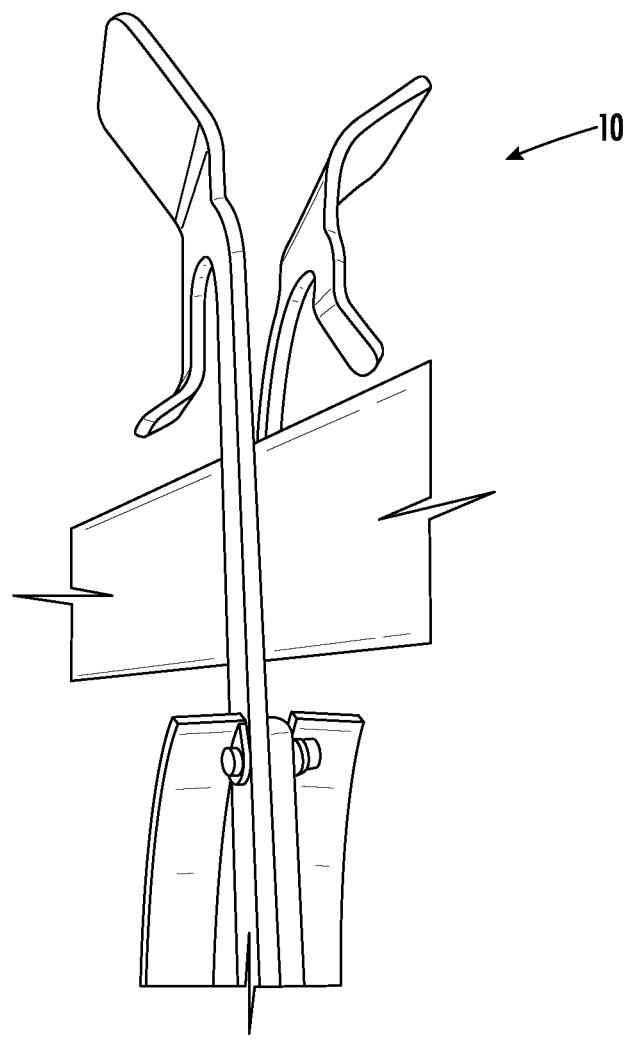
FIGS. 11-13 show the clamp apparatus being removed from the second conductor.
Figure 12:
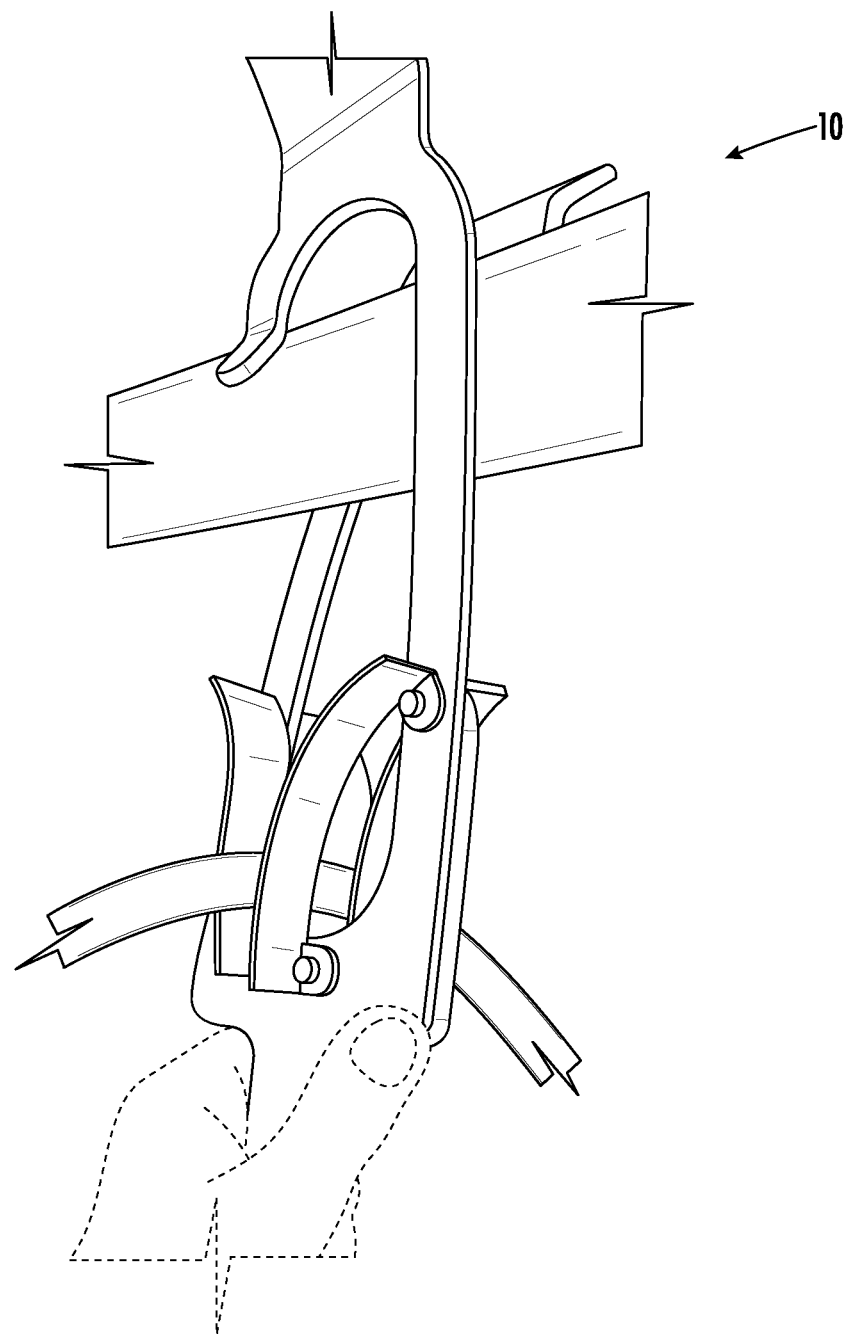
Figure 13:
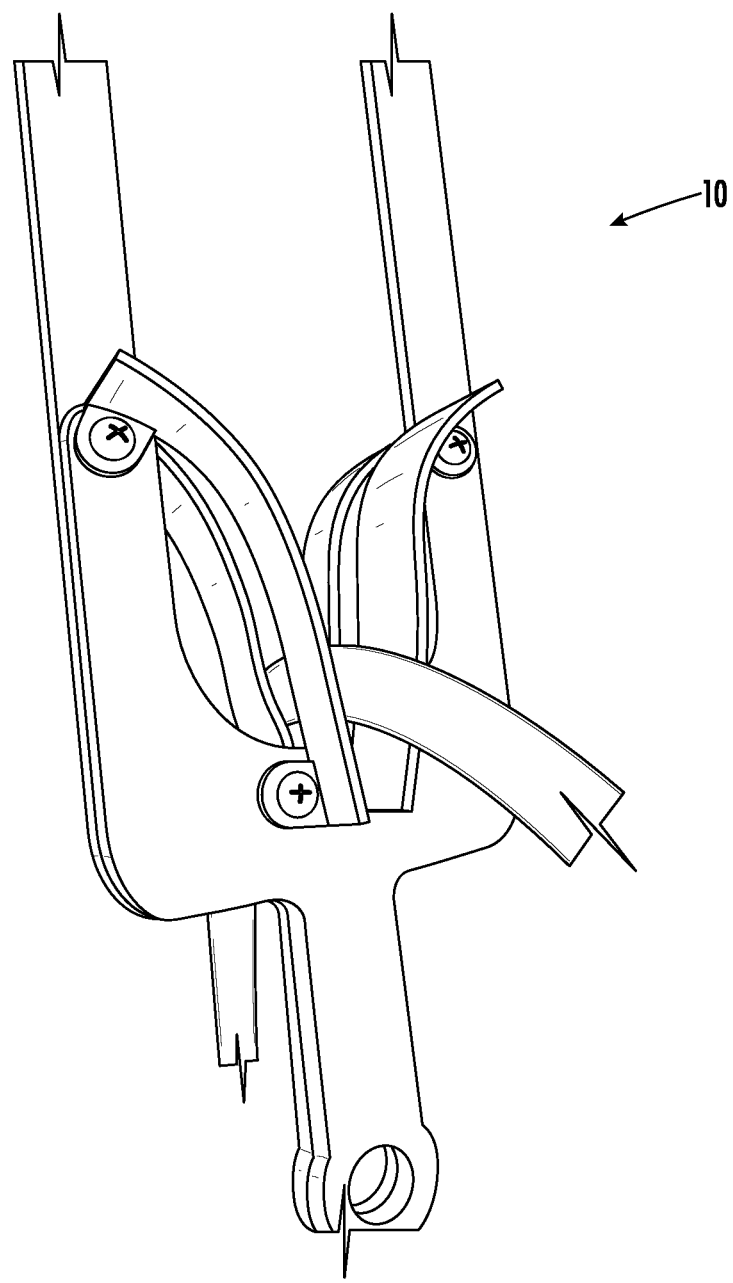

As illustrated in FIGS. 11-13, to remove the clamp apparatus 10, the user attaches the hot stick to aperture 28 and then raises and rotates the clamp apparatus 10 such that the second conductor 36 is now positioned within openings 40, 42 of the first and second halves 12 and 14. By rotating the clamp apparatus 10, the second conductor is no longer positioned in opening 26 and is instead positioned between rear faces 18 and 20. The user then moves the clamp apparatus 10 downward until the second conductor 36 is no longer between the first and second halves 12 and 14. The hot stick can be removed and the first conductor 30 may be removed from the clamp apparatus 10 in the same manner as the second conductor 36.

The foregoing has described a clamp apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

We claim:

1. A clamp apparatus, comprising:
   a first half having a first end and a second end;
   a second half having a first end and a second end, the first and second halves being connected together at the first ends; and
   wherein the first and second halves are enclosed on three sides and partially open on a fourth side, such that when connected together, the partial opening of the first half is closed off by the second half and the partial opening of the second half is closed off by the first half, and wherein the second end of the first half and the second end of the second half are flared outwardly away from a centerline of the clamp apparatus to receive a conductor therebetween.

2. The clamp apparatus of claim 1, wherein a rear face of the first half rests against a rear face of the second half when the first and second halves are connected together.

3. The clamp apparatus of claim 1, further including fingers connected to the clamp apparatus to secure a first conductor therein.

4. The clamp apparatus of claim 1, wherein the first and second ends of the first and second halves are rounded.

5. The clamp apparatus of claim 1, further including pads positioned on the first and second ends of the first and second halves to prevent sliding of the clamp apparatus along a conductor.

6. A method of using the clamp apparatus of claim apparatus of claim 1, compromising:
   positioning a conductor between the second end of the first half and the second end of the second half;
   pushing the clamp apparatus against the conductor to move the clamp apparatus to an open position, the clamp apparatus is pushed against the conductor until the conductor is positioned in a first opening of the first half and a second opening of the second half; and
   rotating the clamp apparatus to position the conductor in an opening of the clamp apparatus and move the clamp apparatus to a closed position, thereby securing the clamp apparatus to the conductor.

7. The method of claim 6, wherein the clamp apparatus is pushed onto the conductor by hand.

8. The method of claim 6, wherein a hot stick is connected to an aperture of the clamp apparatus to allow a user to push the clamp apparatus onto the conductor.

9. The method of claim 6, further including the step of removing the clamp apparatus from the conductor.

10. The method of claim 9, wherein the step of removing the clamp apparatus includes the step of raising the clamp apparatus until the conductor is positioned in the first and second openings of the first and second halves.

11. The method of claim 10, further including the step of rotating the clamp apparatus to move the clamp apparatus from the closed position to the open position.

12. The method of claim 11, further including the step of pulling the clamp apparatus away from the conductor until the conductor is removed from the clamp apparatus and the clamp apparatus moves from the open position to the closed position.

13. The method of claim 6, wherein in the open position, the conductor is positioned between a rear face of the first half and a rear face of the second half.

* * * * *